(12) United States Patent
Milacic et al.

(10) Patent No.: US 9,257,707 B2
(45) Date of Patent: Feb. 9, 2016

(54) APPARATUS AND METHOD FOR FUEL CELL STANDBY

(71) Applicant: Ford Global Technologies, LLC, Dearborn, MI (US)

(72) Inventors: Milos Milacic, New Boston, MI (US); Hans Gangwar, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 13/827,580

(22) Filed: Mar. 14, 2013

(65) Prior Publication Data
US 2014/0272657 A1 Sep. 18, 2014

(51) Int. Cl.
*H01M 8/04* (2006.01)
(52) U.S. Cl.
CPC ...... *H01M 8/04089* (2013.01); *H01M 8/04619* (2013.01); *H01M 8/04753* (2013.01); *H01M 8/04955* (2013.01); *Y02E 60/50* (2013.01)
(58) Field of Classification Search
CPC ..................... H01M 8/04955; H01M 8/04619; Y02E 60/50
USPC ................. 429/428, 429, 400, 444, 443, 446; 320/101
See application file for complete search history.

(56) References Cited

U.S. PATENT DOCUMENTS

| 6,805,984 B2 | 10/2004 | Harth |
| 2006/0003205 A1 | 1/2006 | Yoshida et al. |
| 2010/0151288 A1 | 6/2010 | Chowdhury et al. |
| 2011/0087389 A1 | 4/2011 | Burleigh et al. |
| 2013/0335000 A1* | 12/2013 | Maier ........................... 320/101 |

FOREIGN PATENT DOCUMENTS

WO 2006117969 A1 11/2006

OTHER PUBLICATIONS

Agrawal, "Foil Air/Gas Bearing Technology—An Overview", The American Society of Mechanical Engineers, 1997, 11 pages.
Sasaki et al., "Dissolution and Stabilization of Platinum in Oxygen Cathodes", Polymer Electrolyte Fuel Cell Durability, Springer Science + Business Media, LLC, 2009, p. 7-27.
Noto et al., "Development of Fuel Cell Hybrid Vehicle by Toyota—Durability", SAE International, 2009, 6 pages.
Ahluwalia et al., "Fuel Cell Systems Analysis", Hydrogen, Fuel Cells, and Infrastructure Technologies, 2003, p. 1-5.

* cited by examiner

*Primary Examiner* — Monique Wills
(74) *Attorney, Agent, or Firm* — Damian Porcari; Brooks Kushman P.C.

(57) ABSTRACT

An apparatus for placing a fuel cell stack in a standby mode is provided. The apparatus comprises a compressor, a fuel cell stack, a cathode valve and a controller. The compressor is operably coupled to an air induction system for providing a cathode stream. The fuel cell stack provides electrical power to a load in response to the cathode stream. The cathode valve is operably coupled to an outlet of the fuel cell stack for controlling a flow of the cathode stream to the fuel cell stack. The controller is configured to receive a power request amount for the load and to compare the power request amount to a predetermined amount. The controller is further configured to control the compressor to operate at a minimum speed and the cathode valve to close in response to determining that the power request amount is similar to the predetermined amount.

11 Claims, 2 Drawing Sheets

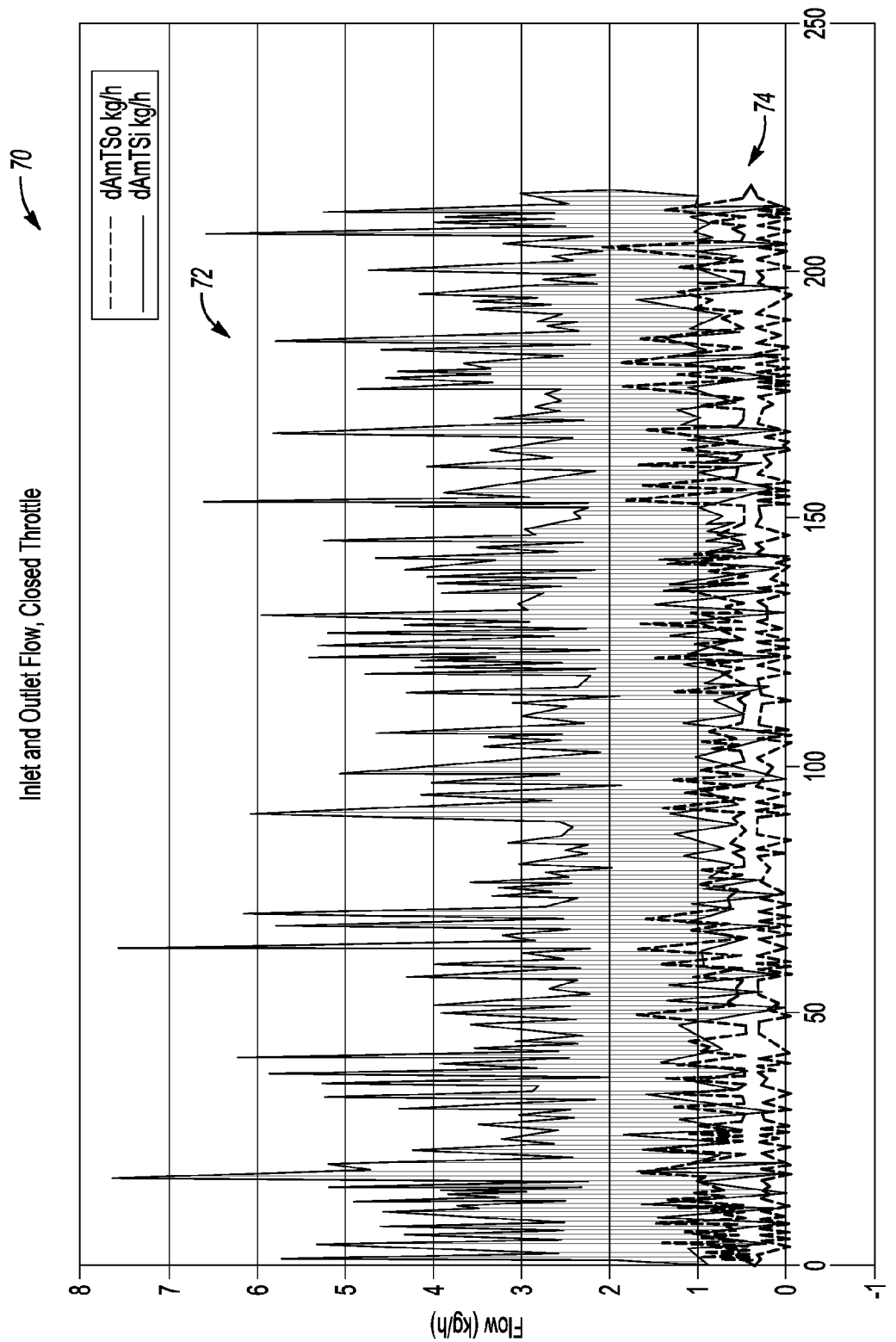

APPARATUS AND METHOD FOR FUEL CELL STANDBY

TECHNICAL FIELD

Embodiments as disclosed herein generally relate to an apparatus and method for a fuel cell standby.

BACKGROUND

A system and method for placing a fuel cell vehicle system into a stand-by-mode is disclosed in U.S. Publication No. 2011/0087389 ("the '389 publication) to Burleigh et al. The '389 publication discloses a system and method for putting a fuel cell vehicle system into a stand-by mode where there is little or no power being consumed. The quantity of fuel being used is minimal and the fuel cell system is able to quickly recover from the mode. The method includes determining whether predetermined stand-by mode vehicle level entrance criteria have been satisfied at a vehicle control level and predetermined stand-by mode fuel cell level entrance criteria have been satisfied for a fuel cell system control level. The method further includes putting the vehicle in the stand-by mode if both the vehicle level entrance criteria and the fuel cell level entrance criteria have been satisfied. The method exits the stand-by mode if predetermined vehicle level exit criteria have been satisfied or predetermined fuel cell level exit criteria have been satisfied.

SUMMARY

An apparatus for placing a fuel cell stack in a standby mode is provided. The apparatus comprises a compressor, a fuel cell stack, a cathode valve and a controller. The compressor is operably coupled to an air induction system for providing a cathode stream. The fuel cell stack receives the cathode stream to provide electrical power to a load. The cathode valve is operably coupled to an outlet of the fuel cell stack for controlling a flow of the cathode stream to the fuel cell stack. The controller is configured to receive a power request amount for the load and to compare the power request amount to a predetermined amount. The controller is further configured to control the compressor to operate at a minimum speed and the cathode valve to close in response to determining that the power request amount is similar to the predetermined amount.

An apparatus for placing a fuel cell stack in a standby mode is provided. The apparatus comprises a compressor, a fuel cell stack, a cathode valve and a controller. The compressor pressurizes ambient air to provide a cathode stream. The fuel cell stack receives the cathode stream to provide electrical power to a load. The cathode valve is operably coupled to an outlet of the fuel cell stack for controlling a flow of the cathode stream to the fuel cell stack. The controller is configured to receive a power request amount for the load and to compare the power request amount to a predetermined amount. The controller is further configured to control the compressor to operate at a minimum speed and the cathode valve to close in response to determining that the power request amount is similar to the predetermined amount.

An apparatus comprising a fuel cell stack, a valve, and a controller is provided. The fuel cell stack receives a cathode stream to power a load. The valve controls a flow of the cathode stream to the fuel cell stack. The controller is configured to compare a power request amount from the load to a predetermined amount and to control a compressor to operate at a minimum speed and the valve to close if the power request amount is similar to the predetermined amount.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 3 is a plot depicting inlet and outlet flow of an air stream for an air valve in accordance to one embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ aspects of the present disclosure.

Low power operation of a fuel cell stack (e.g., high voltage and low current) generally leads to higher catalyst degradation and performance loss. In addition, hybridizing fuel cell powertrains allows the fuel cell to be shut off. In the event a screw compressor is used to provide a cathode stream (or air stream) to the fuel cell stack, stopping such a compressor during fuel cell shutdown may lead to an air starved state which brings voltage of the stack down and therefore reduces catalyst degradation. However, when using a non-positive displacement compressor (e.g., a turbocharger/supercharger) with a rotating impeller (e.g., centrifugal, radial, or partial emissions) to realize high efficiency, such a turbocharger/supercharger may not provide sufficient sealing of the cathode in comparison to the screw compressor. Furthermore, the bearings selected for the compressor may also influence compressor start up time. In the case of air bearings for example, it can take seconds for the compressor to shut off or turn on due to bearing journal having to stably lift off or touch down on the foil.

A stand-by-mode of the compressor in which the compressor operates at some minimum speed would reduce startup time, but cause high cell voltage. The embodiments disclosed herein contemplate running the compressor at its minimum speed while a pressure regulator (or valve) that is operably coupled to a cathode output of the fuel cell stack is closed (e.g., there may be a leak of 4 kg/hr or less). During fuel cell standby (e.g., while compressor operates a minimum speed and pressure regulator is closed and further taking into account leakage current of air at the regulator), a small current draw exhibited at various fuel cells cause a large voltage drop. With this implementation, it may be possible to recognize minor fuel savings while in the stand-by-mode, a faster dynamic response (e.g., no lift-off delay for compressor bearings) and fuel cell stack protection from open circuit voltage ("OCV") or high cell voltages.

Figure 1:
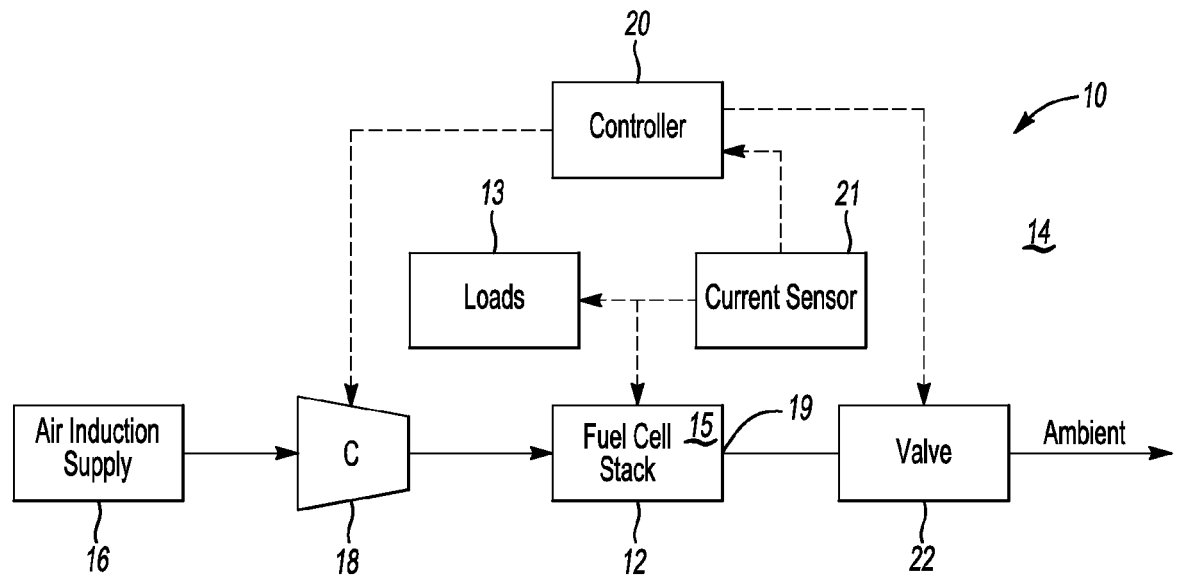
FIG. 1 depicts an apparatus for placing a fuel cell stack in a standby mode in accordance to one embodiment.

FIG. 1 depicts an apparatus 10 for placing a fuel cell stack 12 in a standby mode in accordance to one embodiment. The apparatus 10 may be used in connection with a fuel cell system in a vehicle 14. The apparatus 10 includes a air induction system 16 for providing ambient air (e.g., an air stream or cathode fluid stream) to the fuel cell stack 12. In general, the fuel cell stack 12 is configured to generate electrical current in response to electrochemically converting hydrogen (e.g., from a tank) and oxygen (e.g., from the air stream). The fuel cell stack 12 generally comprises a number of fuel cells 15 that are joined together and each generate a portion of the total amount of electrical current provided by the fuel cell stack 12. A plurality of loads 13 is operably coupled to the fuel cell stack 12 for receiving the electrical current (or power) for consuming and/or storing the power generated by the fuel cell stack 12. The loads 13 may be a battery or other electrical load.

The loads 13 may also include a motor or a plurality of vehicle electrical components that each consume power to function for a particular purpose. For example, such loads 13 may be associated with, and not limited to, a vehicle powertrain; occupant heating and cooling; interior/exterior lighting; entertainment devices; and power locks and windows. The particular types of loads 13 implemented in the vehicle 14 may vary based on vehicle content, the type of motor used, and the particular type of fuel cell stack implemented. A current sensor 21 measures the current generated by fuel cell stack 12. A controller 20 receives the measured current readings from the current sensor 21. The controller 20 determines the amount of power (or power request amount) that is requested from the loads 13 based on the measured current from the current sensor 21. The relevance of the power request amount from the loads 13 will be discussed in more detail below.

A compressor 18 receives the air stream (or filtered ambient air) from the air induction system 16. The compressor 18 pressurizes the air stream and delivers the air stream to the fuel cell stack 12. The controller 20 is operably coupled to the compressor 18 and controls the speed at which the compressor 18 operates. The fuel cell stack 12 includes an outlet 19 for discharging air therefrom. A cathode regulating valve (or air regulating valve) 22 is operably coupled to the controller 20 to control the amount of air that is delivered to the fuel cell stack 12.

In general, the amount of hydrogen and air (or oxygen) that is provided to the fuel cell stack 12 depends on the amount of power that is needed by the loads 13. For example, in moments in which the loads 13 request high power from the fuel cell stack 12, it is desirable to increase the flow rate of the hydrogen and air (or oxygen) to enable the fuel cell stack 12 to generate the required amount of electrical power to drive the loads 13. In this instance, the controller 20 may control the compressor 18 to operate at the desired speed to pressurize the air stream and control the valve 22 to provide the desired amount of air to the fuel cell stack 12. In addition, the controller 20 controls a hydrogen valve (not shown) to enable the desired amount of hydrogen to be provided to the fuel cell stack 12. The fuel cell stack 12 generates the desired amount of power with the hydrogen and air.

In moments in which the power request amount from the loads 13 fall below a predetermined value, the controller 20 controls (i) the compressor 18 to operate at a minimum speed, and (ii) the valve 22 to close thereby significantly substantially cutting off the supply of air to the fuel cell stack 12 (e.g., there is a small amount of air that is provided to the fuel cell stack 12 due to leakage at the valve 22 when closed). Such low power request amounts from the loads 13 may be indicative of the vehicle 14 being stopped or in an idle state (or other low current operating mode). In this case, the fuel cell stack 12 may be placed in a standby mode to preserve fuel (i.e., hydrogen). While in the standby mode, hydrogen is consumed slowly since current is low.

As noted above, in the standby mode, the controller 20 may control the compressor 18 to operate at a minimum speed. This condition enables the compressor 18 to eliminate bearing startup time. The compressor 18 may be implemented as an airfoil bearing compressor (not shown) and the manner in which the compressor 18 reduces startup time when the fuel cell stack 12 is in the standby mode is disclosed in more detail below.

In general, the airfoil bearing compressor 18 comprises a cylindrical housing including a corrugated foil and a top foil positioned therein. A base material of the corrugated foil and the top foil is formed out of steel. The corrugated foil is positioned between the top foil and the housing. The top foil surrounds a rotating journal (or shaft) and is treated with a Teflon® coating to reduce friction thereon as the shaft rotates within the top foil to compress (or pressurize) air. The corrugated foil and the top foil are used instead of ball bearings. The shaft, when initiated, will ride on a top surface of the top foil and at a certain rotating speed will "lift off" from the top surface and ride on a thin film of air. By operating the compressor 18 at the minimum speed while the fuel cell stack 12 is in the standby mode, this condition may eliminate the time needed for the shaft to lift off from the top surface of the top foil and in essence reduce startup time of the compressor 18 (or airfoil bearing compressor).

As noted above, in addition to the controller 20 controlling the compressor 18 to operate at a minimum speed, the controller 20 controls the valve 22 to close thereby substantially preventing the flow of the air stream to the fuel cell stack 12. However, it is recognized that the valve 22, while closed, may still provide some degree of air, which leaks therefrom. In this instance, the fuel cell stack 12 may generate a small amount of current. Such current may be used to reduce fuel cell voltage (e.g., voltage at each fuel cell 15) from an Open Circuit Voltage (OCV) to a voltage that does not negatively impact fuel cell performance. This will be described in more detail below.

It is known that OCV (e.g., an OCV for a hydrogen PEM that is approximately 1.23V) causes platinum at a cathode side of the fuel cell 15 to dissolve under various fuel cell operating conditions. This condition is set forth in K. Sasaki et al. "Dissolution and Stabilization of Platinum in Oxygen Cathodes," Springer Science+Business Media, LLC. 2009, pps. 7-27 (see also (Eds.) F. N. Buchi; M. Inaba; and Th. J. Schmidt 2009, Hardcover ISBN: 978-0-387-85534-9 (hereafter "Dissolution")). However, it is further known that a cell voltage at 0.85V or greater may also cause degradation of the catalyst layer. This condition is set forth in Noto et al. "Development of Fuel Cell Hybid Vehicle by Toyota—Durability", SAE International, January 2009. Such dissolution of the platinum may cause degradation of a catalyst layer on the cathode side due to fuel cell cycling such as stop and go driving and fuel cell starvation. Specifically, when the fuel cell stack is in the standby mode (or stop mode), this condition may cause the cell voltage to exceed 0.85V. As a result, platinum at the cathode side of the fuel cell 15 may dissolve if the cell voltage exceeds 0.85V thereby affecting the performance of the fuel cell stack 12. For example, when the cell voltage exceeds 0.85V, then the platinum can undergo the dissolution process with water as exhibited by the following: $Pt+H_2O \rightarrow (Pt-OH)+H^++e^-$ (0.85V<E<1.10V).

To mitigate the dissolution of the platinum at the cathode of the fuel cell stack 12, the cell voltage needs to be reduced while the fuel cell stack 12 is in the standby mode. For example, as noted above, when the valve 22 is closed in the standby mode, some degree of air will leak therefrom thereby enabling a small amount of air to pass to the fuel cell stack 12 which causes the fuel cell stack 12 to generate a small amount of current. This small amount of current causes the cell voltage at each fuel cell 15 to drop below 0.85V. It is recognized that the controller 20 enables for an appropriate amount of hydrogen along with the air to be provided to the fuel cell stack 12 so that such a small amount of current is generated.

As exhibited above, in the standby mode, (i) the condition of operating the compressor 18 at the minimum speed and controlling the valve 22 to close provides a fuel savings in addition to mitigating the startup time of the compressor 18 and (ii) the condition of closing the valve 22 and ensuing leakage of air flow to the fuel cell stack 12 to generate a small amount of current reduces the cell voltage, which then mitigates the dissolution of the platinum at the cathode of the fuel cell stack 12.

Figure 2:
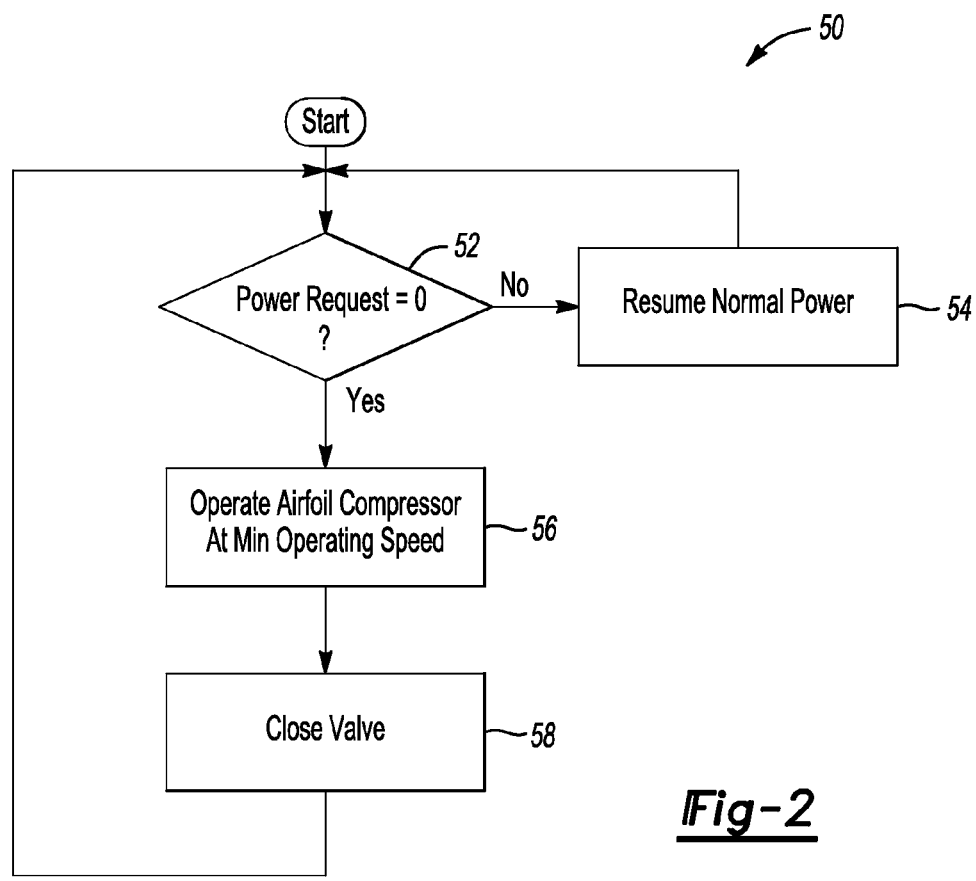
FIG. 2 depicts a method for placing the fuel cell stack in a standby mode in accordance to one embodiment.

FIG. 2 depicts a method 50 for placing the fuel cell stack 12 in the standby mode in accordance to one embodiment.

In operation 52, the controller 20 receives a current reading from the current sensor 21 and determines the amount of power (or power request amount) that is requested from the loads 13 based on the measured current reading. If the power request amount from the loads 13 is not equal to zero, then the method 50 proceeds to operation 54. If so, then the method 50 moves to operation 56.

In operation 54, the controller 20 controls the hydrogen valve (not shown) and the valve 22 which provides hydrogen and air, respectively to the fuel cell stack 12 to generate the electrical current to meet the power request amount as needed by the loads 13.

Operations 56 and 58 generally correspond to the fuel cell stack 12 being placed in the standby mode and can be executed simultaneously.

In operation 56, the controller 20 controls the compressor 18 (e.g., air foil compressor) to operate at a minimum speed. As noted above, by controlling the compressor 18 to operate at a minimum speed, such a condition eliminates the time needed for the shaft to lift off from the top surface of the top foil and in essence reduce startup time of the compressor 18.

In operation 58, the controller 20 controls the valve 22 to close. In this case, the valve 22 may enable a small amount of air to leak therefrom to the fuel cell stack 12. The fuel cell stack 12 generates a small amount of current in response to the air leakage (and hydrogen). This small amount of current drives down the cell voltage away from the OCV and consequently away from the high cell voltage of 0.85V. This condition mitigates the dissolution of platinum at the cathode side of the fuel cells 15.

It is recognized that (i) a fuel savings may be achieved by substantially shutting down the various aspects of the apparatus 10 (or system) in the standby mode, (ii) no-lift off delay will be experienced at the compressor 18 in the standby mode as the compressor 18 operates at a minimum speed; and (iii) small current draw by the loads 13 generated due to the fuel cell stack 12 receiving the leaked air at the valve 22 will cause cell voltage drop below predetermined levels to preserve platinum at the cathode side of fuel cell 15.

FIG. 3 is a plot 70 depicting inlet and outlet flow of the air stream for the compressor 18 in accordance to one embodiment. The plot 70 depicts a first section 72 and a second section 74. The first section 72 indicates one example of the mass flow rate of the airstream at an outlet of the compressor 18 when the fuel cell stack 12 is operating in a normal mode (e.g., not in a stand mode). It is recognized that the mass flow rate of the air stream at the compressor 18 in the normal mode may differ than what is shown and that the first section 72 is shown to serve as an example.

The second section 74 indicates one example of the mass flow rate of the airstream at the outlet of the compressor 18 when the fuel cell stack 12 is in the standby mode. As shown, a small amount of air is provided from the outlet of the compressor 18. Such a small of amount of air at the outlet of the compressor 18 may be caused due to air leaking from the valve 22 even though the valve 22 is closed. The fuel cell stack 12 uses this leaked air to provide current, which then reduces the OCV below the predetermined level to mitigate platinum dissolution at the cathode side of the fuel cells 15.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for placing a fuel cell stack in a standby mode, the apparatus comprising:
a compressor operably coupled to an air induction system for providing a cathode stream;
a fuel cell stack for receiving the cathode stream to provide electrical power to a load; a cathode valve operably coupled to an outlet of the fuel cell stack for controlling a flow of the cathode stream to the fuel cell stack; and
a controller configured to:
receive a power request amount for the load;
compare the power request amount to a predetermined amount; and
control the compressor to operate at a minimum speed and the cathode valve to close in response to determining that the power request amount is similar to the predetermined amount,
wherein the fuel cell stack operates in the standby mode when the controller determines that the power request amount is similar to the predetermined amount;
wherein the fuel cell stack includes a plurality of fuel cells that are capable of operating above a predetermined voltage level when the fuel cell stack is in the standby mode, and
wherein the cathode valve is configured to generate a leaked cathode stream in response to being controlled to close.

2. The apparatus of claim 1 wherein the predetermined voltage level is similar to 0.85V.

3. The apparatus of claim 1 wherein the leaked cathode stream enables the fuel cell stack to generate electrical current for reducing a voltage at each of the plurality of fuel cells to a value that is less than the predetermined voltage level.

4. The apparatus of claim 1 wherein the leaked cathode stream enables the fuel cell stack to generate electrical current for reducing voltage that is less than the predetermined voltage level to prevent platinum within each of the plurality of fuel cells from dissolving.

5. An apparatus for placing a fuel cell stack in a standby mode, the apparatus comprising:
a compressor for pressurizing ambient air to provide a cathode stream;
a fuel cell stack for receiving the cathode stream to provide electrical power to a load; a cathode valve operably coupled to an outlet of the fuel cell stack for controlling a flow of the cathode stream to the fuel cell stack; and
a controller configured to:

receive a power request amount for the load;
compare the power request amount to a predetermined amount; and
control the compressor to operate at a minimum speed and the cathode valve to close in response to determining that the power request amount is similar to the predetermined amount,
wherein the fuel cell stack operates in the standby mode when the controller determines that the power request amount is similar to the predetermined amount;
wherein the fuel cell stack includes a plurality of fuel cells that are capable of operating above a predetermined voltage level when the fuel cell stack is in the standby mode; and
wherein the cathode valve is configured to generate a leaked cathode stream in response to being controlled to close.

6. The apparatus of claim 5 wherein the predetermined voltage level is similar to 0.85V.

7. The apparatus of claim 5 wherein the leaked cathode stream enables the fuel cell stack to generate electrical current for reducing a voltage at each of the plurality of fuel cells to a value that is less than the predetermined voltage level.

8. The apparatus of claim 5 wherein the leaked cathode stream enables the fuel cell stack to generate electrical current for reducing voltage that is less than the predetermined voltage level to prevent platinum within each of the plurality of fuel cells from dissolving.

9. An apparatus comprising:
a fuel cell stack for receiving a cathode stream to power a load;
a valve for controlling a flow of the cathode stream to the fuel cell stack; and
a controller configured to:
compare a power request amount from the load to a predetermined amount; and
control a compressor to operate at a minimum speed and the valve to close if the power request amount is similar to the predetermined amount,
wherein the fuel cell stack operates in a standby mode when the controller determines that the power request amount is similar to the predetermined amount;
wherein the fuel cell stack includes a plurality of fuel cells that are capable of operating above a predetermined voltage level when the fuel cell stack is in the standby mode; and
wherein the valve is configured to generate a leaked cathode stream in response to being controlled to close.

10. The apparatus of claim 9 wherein the predetermined voltage level is similar to 0.85V.

11. The apparatus of claim 9 wherein the leaked cathode stream enables the fuel cell stack to generate electrical current for reducing a voltage at each of the plurality of fuel cells to a value that is less than the predetermined voltage level.

* * * * *